United States Patent [19]

Ahokas et al.

[11] 4,069,925
[45] Jan. 24, 1978

[54] APPARATUS FOR STACKING HANGING PLATES

[75] Inventors: Pentti Ahokas, Santtio; Matti Lallo, Rauma, both of Finland

[73] Assignee: Lonnstrom Oy, Finland

[21] Appl. No.: 675,899

[22] Filed: Apr. 12, 1976

[30] Foreign Application Priority Data

Apr. 14, 1975 Finland ................................. 751100

[51] Int. Cl.² ............................................. B65G 57/14
[52] U.S. Cl. ................................. 214/6 H; 198/473; 198/681; 198/856
[58] Field of Search ........... 214/6 DK, 6 H; 271/213, 271/215, 217, 256, 258; 198/473, 681, 722, 856

[56] References Cited

U.S. PATENT DOCUMENTS

| | | | |
|---|---|---|---|
| 533,443 | 2/1895 | Dejonge | 118/231 |
| 1,686,680 | 10/1928 | Case | 198/681 |
| 2,879,885 | 3/1959 | Myers | 198/681 X |
| 2,894,147 | 7/1959 | Stidwill | 214/6 H X |
| 2,965,214 | 12/1960 | Schlumpf et al. | 198/473 |
| 3,046,010 | 7/1962 | Schneider | 271/219 |
| 3,319,355 | 5/1967 | Lagnese | 271/204 X |
| 3,656,603 | 4/1972 | Bontempi et al. | 198/473 |
| 3,892,168 | 7/1975 | Grobman | 214/6 H X |
| 3,910,424 | 10/1975 | Kawahara | 214/6 DK |

Primary Examiner—L. J. Paperner
Attorney, Agent, or Firm—Steinberg & Blake

[57] ABSTRACT

Apparatus for forming a stack of plates from a series of plates which respectively hang from rods conveyed by a rod-conveyer along a predetermined path. A toothed conveyer receives the rods one after the other from the rod-conveyer and conveys the rods along a plate-turning path. A plate-turning cam structure engages each plate as each rod is conveyed along the plate-turning path for turning each plate from its substantially upright hanging attitude into a substantially horizontal attitude situated over a stack-forming table. As each plate moves beyond the plate-turning cam structure onto a stack at the table, each rod is received in a channel out of which each rod is pushed while being disengaged from the plate received at the stack which forms on the table.

17 Claims, 5 Drawing Figures

APPARATUS FOR STACKING HANGING PLATES

BACKGROUND OF THE INVENTION

The present invention relates to an apparatus for stacking plates which initially hang from rods which are conveyed by a rod-conveyer. These plates may, for example, be completed cathode plates which have been produced in an electrolytic refining process.

Apparatus of the above type is already known. For example, an apparatus for turning and stacking plates of the above type is disclosed at page 7 of Outokumpu News, No. 2, 1971. Thus, reference may be made to the latter publication with respect to the state of the art. Equivalent prior art devices of this general type have not proved to be satisfactory in practice. The reason for this is that it has not been possible with the prior apparatus to achieve a high speed operation. Moreover, previously known apparatus is prone to service problems.

SUMMARY OF THE INVENTION

It is accordingly a primary object of the present invention to provide a plate-turning and stacking apparatus wherein the problems encountered with previously known apparatus of this type are avoided.

Moreover, it is an object of the present invention to provide an apparatus of this type which is capable of operating at a much higher speed then has heretofore been possible.

In addition, it is an object of the present invention to provide an apparatus capable of directing a rod from which a plate is initially suspended to a precisely determined location while also simplifying the operation and construction of that part of the structure which removes the supporting rod from the plate previously suspended therefrom.

It is also an object of the present invention to provide an apparatus which can, in a manner which is superior than has heretofore been possible, turn and stack plates of the above in such a way that stack of the plates form on a suitable table with the formed stack capable of being transported to a stack-transporting structure which will carry the stack beyond the table on which the stack was initially formed.

Moreover, it is an object of the present invention to provide an apparatus of the above type which not only can operate at a much higher speed than has heretofore been possible but which also is capable of being efficiently protected against problems which might arise during the operation of the apparatus.

In order to achieve the above objects, the apparatus of the invention includes a toothed conveyer means for receiving the rods one after the other from the rod-conveyer means, this toothed conveyer means having teeth which engage each rod to transport the latter with a plate connected thereto along a plate-turning path. The teeth of the toothed conveyer lift the rod with a plate suspended therefrom and bring the plate into engagement with a plate-turning means in the form of a cam which guides each plate while the latter turns from its substantially upright hanging attitude into a substantially horizontal attitude, the plate-turning guide cam engaging each plate at a lower portion thereof while the upper portion thereof remains connected with a rod during transportation of the latter by the toothed conveyer means. Thus, as each plate is turned it is raised upwardly and arrives over a stack-forming table means on which each plate is supported after traveling beyond the plate-turning means. Each rod is received in a channel means at the end of the turning of each plate to a horizontal attitude where each plate forms part of a stack on the stack-forming table means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
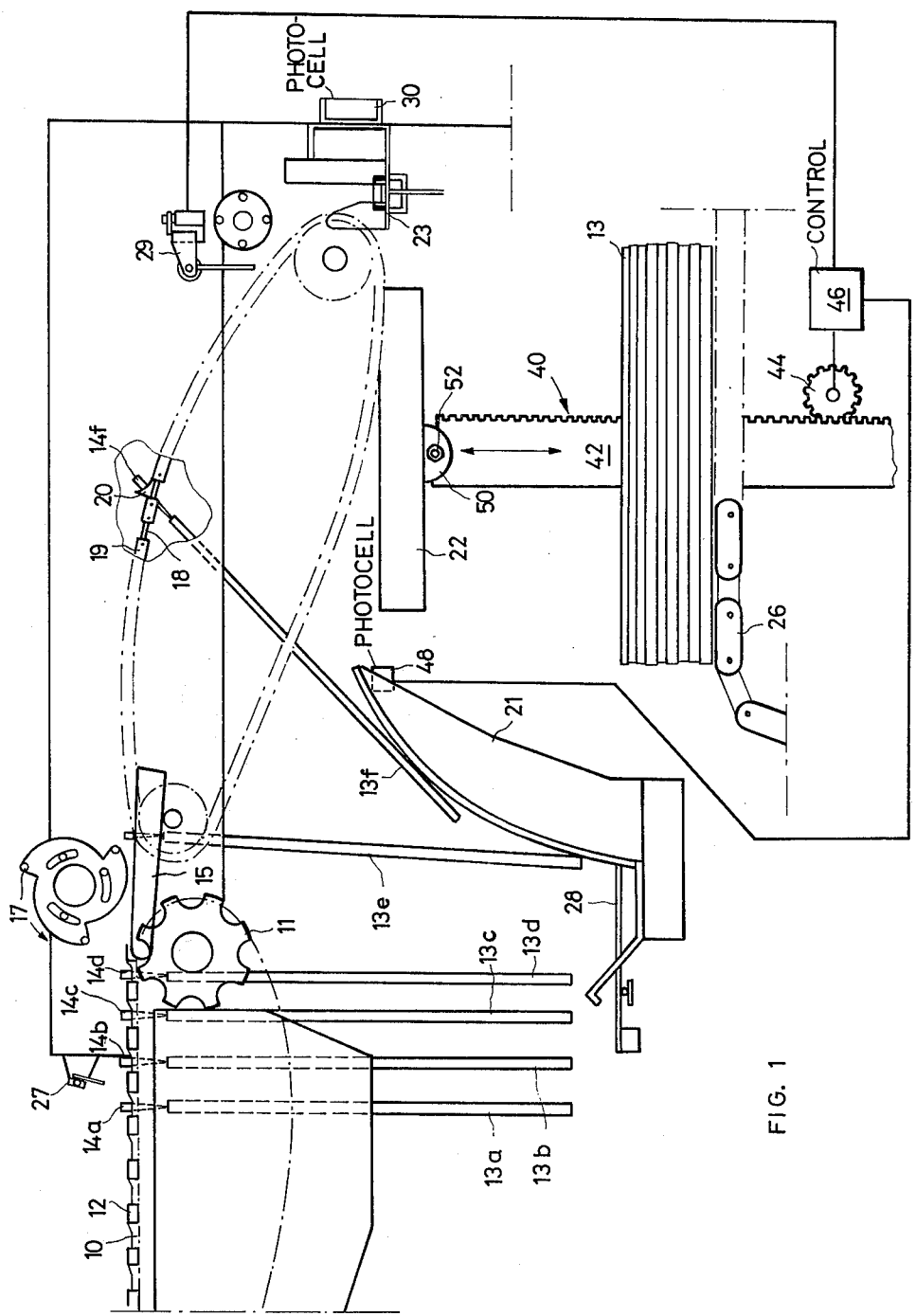
FIG. 1 is a fragmentary schematic side elevation of one possible embodiment of an apparatus according to the invention.

The apparatus of the invention is illustrated in connection with the forming of a stack of cathode plates 13 (FIG. 1), these plates which are formed into the stack arriving from an electrolytic refining process where the completed cathode plates have been produced. Just prior to being formed into the stack illustrated in FIG. 1, it is necessary for each plate to be turned from a substantially upright hanging attitude into a substantially horizontal attitude located at the top of the stack during the formation thereof. A series of plates 13a–13f are respectively illustrated schematically in FIG. 1 in successive stages as the plates successively arrive at the apparatus of the invention and are treated thereby. The several plates are initially suspended in a known way from rods such as the illustrated rods 14a–14f shown respectively connected with the plates 13a–13f. The several rods with the plates hanging therefrom are conveyed by a rod-conveyer means 10 along a substantially horizontal path. The stack of plates 13 is formed on a stack-forming table means 22 which has a substantially horizontal upper surface. When each plate is received at the stack, the rod previously connected thereto is removed therefrom in the manner described below. When a given number of plates 13 have been received in a stack on the table 22, the stack is received by a stack-conveyer means 26 which carries the stack away from the table 22. This conveyer 26 conveys the stack 13 to weighing scales, for example.

It is advantageous if the speed of the rod-conveyer means 10 is adjustable while the operation of a rod-advancing means 16 (FIGS. 1 and 4) and a toothed conveyer means 18, shown in FIG. 1, are maintained in synchronism with the speed of the conveyer means 10 by way of a gear and roller chain transmission structure. With the apparatus of the invention it is possible to achieve a considerably higher operating speed than in previously known apparatus of the same type utilized for equivalent purposes, and in addition the apparatus of the invention is capable of being efficiently protected against problems in operation.

Figure 4:
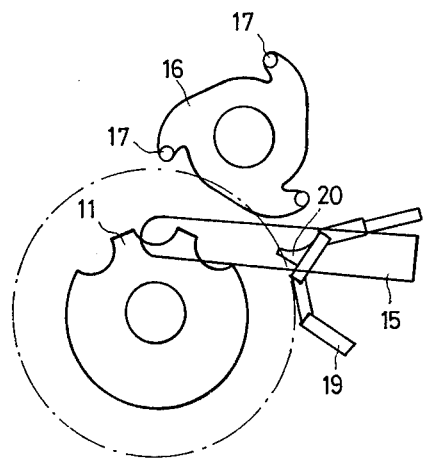
FIG. 4 is a schematic side elevation of that part of the structure where each rod is transferred from a rod-conveyer to a toothed conveyer means.

The toothed conveyer means 18 has at the path along which the rods are transported by the rod-conveyer means 10 a slide-guide means 15 on which each rod is received as the chains 12 of the conveyer means 10 travel around sprockets 11. Thus, the slide-guide means 15 may be in the form of stationary substantially horizontally extending fingers situated between the chains 12 at an elevation corresponding to the upper portions of the sprockets 11 so that each rod from which a cathode plate is suspended will be deposited on the upper edges of the fingers which form the slide-guide means 15. It will be noted that these fingers 15 have upper edges which are inclined downwardly toward the right to some extent, as shown in FIGS. 1 and 4. Moreover, initially the conveyer means 10 itself serves to shift each of the rods along the upper edge regions of the fingers 15.

In this way each rod becomes situated in the path of movement of cam portions 17 of a pair of rotary wheels which form an advancing means 16. Thus, the cam portions 17 turn with the wheels in a counterclockwise direction, as viewed in FIGS. 1 and 4, with each cam 17 of each wheel engaging a rod on the slide-guide means 15 and advancing the rod into register with teeth 20 of the toothed conveyer means 18. Thus, the toothed-conveyer means may take the form of a pair of chains guided on suitable sprockets for movement along the path shown for the most part in dot-dash lines in FIG. 1. The teeth 20 are arranged so that as the aligned cams of the pair of wheels of the advancing means 16 move a rod along the upper edges of the fingers 15, a pair of teeth 20 will move beneath the rod and raise and lift the latter upwardly from and to the right beyond the slide-guide means 15, as is apparent from FIG. 1. While the pair of wheels forming the means 16 may each have at least one cam 17, preferably each wheel has three cams 17 as illustrated in FIG. 4. Thus by way of these cams each rod from which a plate 13 is suspended will be shifted along the slide-guide fingers 15 while resting on the upper edges thereof to be moved into register with the upwardly traveling teeth 20 at the left end of the chains 19 which form the conveyer means 18. The advancing means 16 is rotated from any suitable drive in such a way that the cams 17 advance each of the rods such as the rods 14a–14f along the fingers 15 at a speed greater than the speed with which the several rods were previously transported by the rod-conveyer means 10.

The conveyer means 18 includes at least a pair of coextensive chains 19 each of which is provided with at least one tooth 20, although each chain 19 has several teeth 20, and the teeth 20 of the chains 19 are arranged so as to be aligned in pairs so that each rod is engaged by a pair of teeth 20. Thus a pair of teeth 20 will engage and lift a supporting rod 14 from the guide means 15 immediately after each rod 14 with a plate 13 suspended therefrom has traveled beyond the conveyer means 10. It is also of advantage if the speed of travel of the chains 19 is such that each rod engaged by a pair of teeth 20 of a pair of chains 19 is conveyed away from the slide-guide means 15 at a speed greater than the speed with which each rod is shifted along the guide means 15 by a pair of cams 17 of the advancing means 16. While the conveyer means 18 may of course differ structurally from what has been shown in the drawings and described above, the above-described structure is preferred because it operates very effectively to achieve the desired results.

Approximately at the time when the teeth 20 of chains 19 lift a rod from the guide means 15, the lower portion of a cathode plate 13 suspended from the rod engages a plate-turning means 21 in the form of a stationary cam structure having a convexly curved camming surface extending upwardly and curving toward the right, as viewed in FIG. 1. Thus it will be seen that the plate 13e has just come into engagement with the plate-turning means 21, at the lower edge region of the plate 13e, while the rod supporting the latter is about to be lifted upwardly away from the guide means 15, whereas on the other hand the plate 13f has already been advanced along the plate-turning means 21 almost into its horizontal attitude. Thus each of the plates while sliding along the plate-turning means 21 also carries out a rolling or tilting movement therealong to have its upright hanging attitude changed into a substantially horizontal attitude. Thus each plate 13 rolls around and slides along the camming surface of the stationary cam structure 21 while each rod 14 from which the plate is suspended is transported along a plate-turning path by the toothed conveyer means 18, and in this way each plate becomes situated over the stack-forming table means 22.

Figure 5:
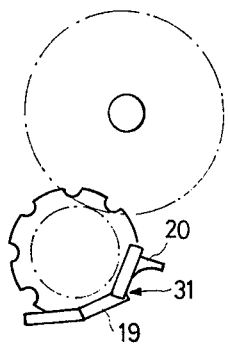
FIG. 5 illustrates further details of the toothed conveyer means.

Near the end of the turning phase of the operation when each plate is in a substantially horizontal attitude and is about to move beyond the upper edge of the cam structure 21, the rod 14 which is still connected to each plate is guided into a channel means 23 which forms a means for receiving each rod while the conveyer means 18 continues to operate and which has an upper open portion into which each rod can enter, the channel means 23 being shown in FIG. 1 just to the right of and somewhat lower than the right end of the conveyer means 18. As is shown most clearly in FIG. 5, the chains 19 of the conveyer means 18 are provided with counterteeth 31 which are directed oppositely to the teeth 20 so that as the latter turn to a position such as that shown in FIG. 5, the teeth 31 will engage the rod to prevent the latter from falling. Thus at the end of the turning phase of each plate the supporting rod 14 will remain connected thereto since it is prevented from falling by the counterteeth 31. At the end of the turning phase each cathode plate 13 has become the topmost plate of the stack which is being formed on the table 22.

Figure 3:
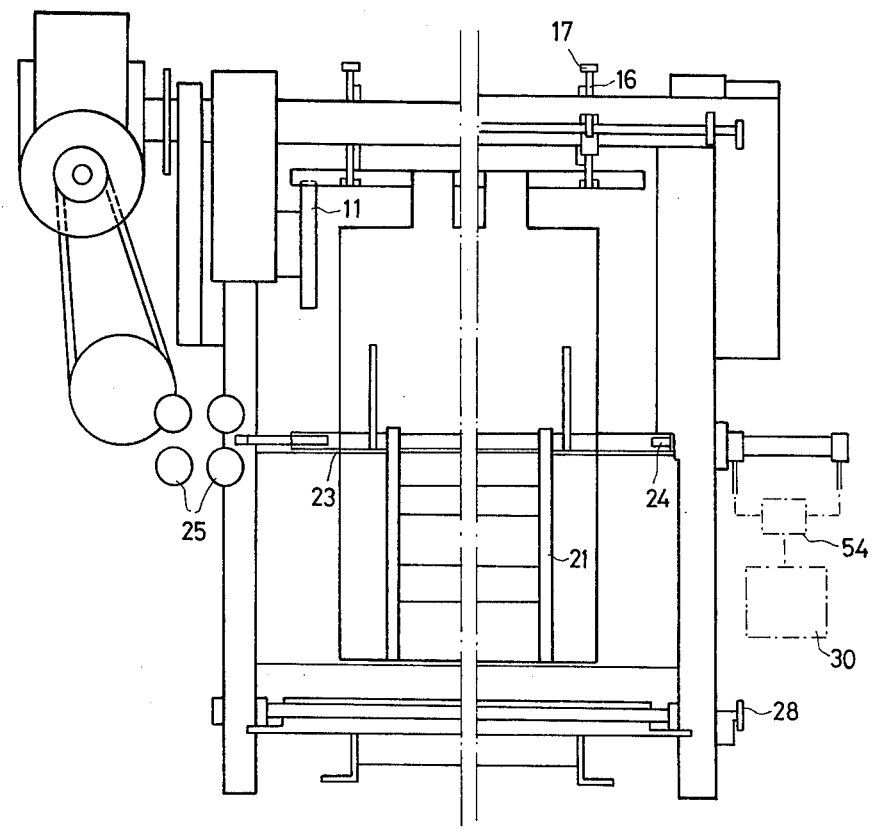
FIG. 3 is a fragmentary schematic front elevation of the apparatus of FIG. 1 seen from the left of FIG. 1.

As is indicated in FIG. 3, at the right end of the channel means 23, as viewed in FIG. 3, there is a pusher means 24 which at the end of the turning of each plate 13 pushes each rod to the left, as viewed in FIG. 3, into engagement with rolls of a removal means 25, the rolls of which are driven in any suitable way so as to engage each rod and remove it out of the channel 23 toward the left, as viewed in FIG. 3, the rods being received from the removal means 25 in any suitable container, for example, from which the rods are taken to be connected again to a plate 13. The removal rolls of the removal means 25 pull each supporting rod 14 completely free of the supporting lugs of each cathode plate 13, while at the same time displacing each rod 14 away from the conveyer means 18.

An adjusting means 40 is operatively connected with the stack-forming table means 22 for adjusting the elevation thereof. This adjusting means 40 may take the form, for example, of a vertically extending bar 42 guided by way of any suitable vertical guides so that the bar 42 will move up and down as shown by the double-headed arrow in FIG. 1. A portion of the bar 42 may, for example, have rack teeth meshing with a pinion 44 rotated by way of a suitable electrically responsive control means 46 schematically indicated in FIG. 1. A photoelectric control means 48 is electrically connected with the control means 46 for actuating the latter. This means 48 includes a photocell which detects when a plate has been deposited on the top of the stack which is forming on the table 22. When the photocell 48 detects the presence of an additional plate on the stack, the photocell 48 responds by actuating the control means 46 which in turn operates the adjusting means 40 to lower the table 22 automatically by increment equal to the thickness of a plate 13. Thus, whenever a new cathode plate 13 arrives at the top of a stack forming on the table 22, the table 22 is automatically lowered by a distance corresponding to the thickness of a plate 13. In a manner which is described below, when the stack forming on the table 22 reaches a given size, which is to say when a certain number of plates 13 are situated in a stack, the control means 46 is actuated in a manner described below so as to automatically operate the adjusting means 40 for lowering the table 22 to its lowermost position situated at an elevation lower than the upper run of the chains of the stack-transporting conveyer means 26. The plates extend beyond the table 22, and the latter is capable of moving downwardly between the chains of the conveyer 26, so that when the table 22 is lowered to its lowermost position, the lowermost plate will be engaged by the chains of the conveyer 26 while the table 22 moves below the stack now carried by the conveyer 26 which operates to convey this stack toward the right, as viewed in FIG. 1, to suitable weighing scales, for example, with the control means 46 then operating automatically to reverse the rotation of the pinion 44 so as to return the table 22 automatically to its uppermost position in order to commence the formation of a new stack. It is advantageous to be capable of adjusting the inclination of the table 22, and for this purpose the table 22 is fixed at its lower surface to one or more lugs 50 pivotally connected as by way of a suitable bolt and nut structure 52 to the top end of the vertically movable bar 42 of the adjusting means 40. Thus the bolt and nut structure 52 can be loosened to permit the inclination of the table 22 to be adjusted whereupon this bolt and nut structure 52 can be tightened so as to maintain the table 22 in its adjusted inclination.

The apparatus of the invention includes also a plurality of automatically responding structures which are provided for control and safety purposes. Thus, it will be seen that the chains 12 of the conveyer means 10 are formed with notches in which the several rods are received. In the event that a rod is not situated in one of these notches but is instead carried by a higher portion of the chain 12, then the rod will engage and actuate a safety device 27 in the form of a suitable electrical switch actuated by such a rod so as to terminate the operation of the apparatus and sound an alarm. The operator will then place the rod properly in a notch of the chain 12 and start the operation of the apparatus again.

In the event that the lugs by which each cathode plate is suspended from a rod should break so that the cathode plate falls during the operating phase when a plate is turning from its upright to its substantially horizontal attitude, then the falling plate will descend into engagement with a safety means 28 also in the form of a switch which upon being engaged by a falling plate automatically terminates the operation of the apparatus and sets off an alarm. In this way also if a plate should fall the operator will be able to again start the operation after the fallen plate has been removed or placed on the stack.

In addition, the apparatus includes a counter means 29 which automatically provides one pulse for each plate 13 received on the stack forming on the table 22. Thus, each rod 14 as it approaches the right end of the conveyer means 18, as viewed in FIG. 1, will engage a finger of the counter means 29 so as to actuate the latter, and this counter means 29 will store in the control means 46 a certain number of pulses which can be predetermined. This predetermined number of pulses corresponds to the number of plates 13 which are to be situated in a completed stack. Thus, when the predetermined number of pulses have been counted by the counter means 29, the adjusting means 40 is automatically actuated to lower the table 22 to its lowermost position, thus depositing the stack on the stack-conveyer means 26 as described above.

Figure 2:
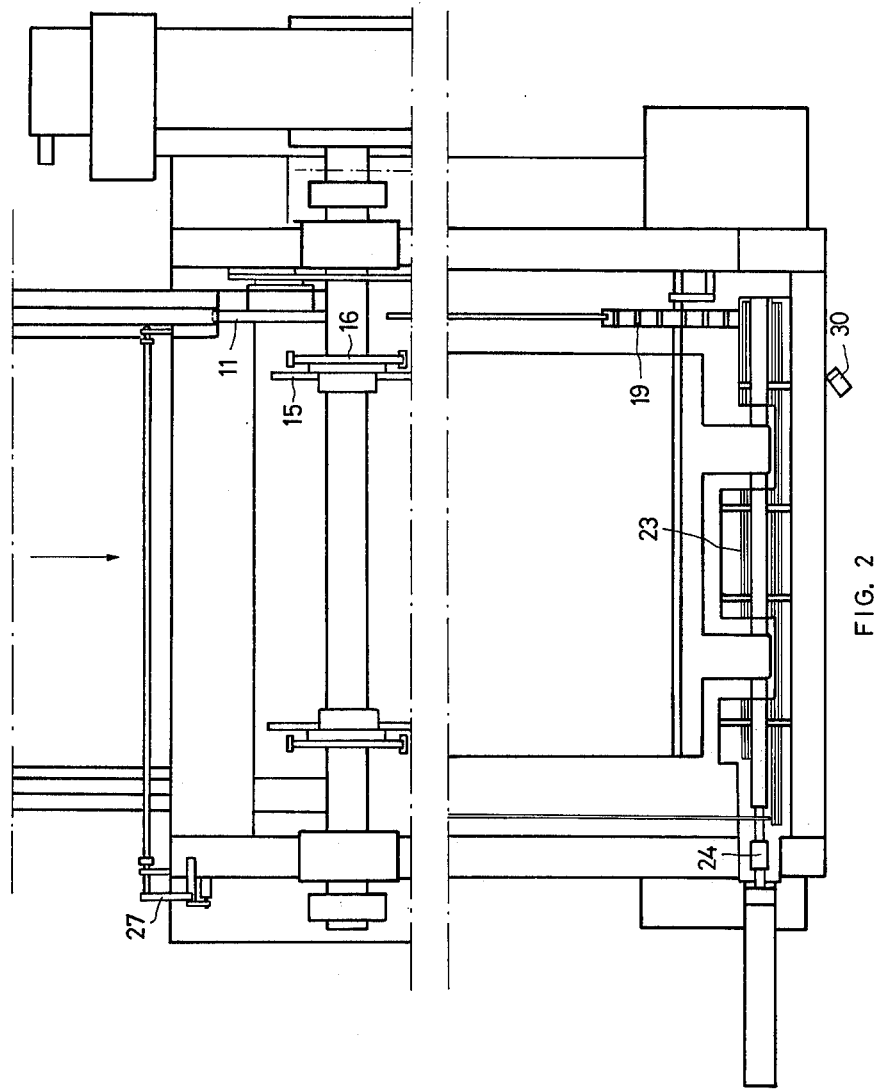
FIG. 2 is a schematic fragmentary top plan view of the apparatus of FIG. 1.

Adjacent to the channel means 23 is a photocell 30 which detects the arrival of a rod into the channel means 23. As is shown schematically in FIG. 3, the photocell 30 is capable of acting through a suitable control unit 54 on a double-acting piston-and-cylinder assembly connected with the pusher 24 so as to actuate the latter to push a rod out of the channel 23 into the operating range of the removal means 25 and then returning the pusher 24 back to its starting position, so that the above operations may be repeated. The position of the photocell 30 of course is shown only schematically in FIG. 3. The actual position of the photocell 30 is apparent from FIGS. 1 and 2 which also illustrate the position of various other of the components referred to above. It is to be noted that while FIG. 3 shows the structure of FIG. 1 as seen from the left, FIG. 2 shows in a top plan view the structure shown at the right of FIG. 1. Thus, by way of the photocell 30 actuation of the pusher means 24 will be prevented until a rod, such as one of the rods 14a–14f, is situated at the bottom of the channel means 23.

While there has been presented above a description of one advantageous embodiment of the invention, it is obvious to one skilled in the art that numerous modifications are possible without digression from within the protective scope of the invention. Thus, for example, the structural details of components of the apparatus may vary considerably, depending upon the particular application which is to be made of the apparatus of the invention. However, the essential features are the functional relationships between the various components as set forth above.

What is claimed is:

1. In an apparatus for forming a stack of plates, such as cathode plates produced in an electrolytic refining process, from a series of hanging plates which respectively hang from rods conveyed by a rod-conveyer means one after the other along a predetermined path, toothed conveyer means having a portion situated at said path, said toothed conveyer means receiving said rods one after the other from said rod-conveyer means and having teeth which engage each rod arriving at said toothed conveyer means to transport the rod with a plate hanging therefrom beyond said rod-conveyer means along a plate-turning path, turning means situated in the path of movement of each plate as each rod is conveyed by said toothed conveyer means along said plate-turning path for engaging each plate and turning the latter from a substantially upright hanging attitude to a substantially horizontal attitude with said toothed conveyer means transporting each rod with a plate connected thereto for advancing each plate beyond said plate-turning means after each plate has been turned by the latter at least substantially into said horizontal attitude, stack-forming table means situated beyond said plate-turning means beneath a plate which has been turned thereby substantially to a horizontal attitude for receiving the plates one after the other while a stack is formed therefrom on said table means, and means situated at a region of said toothed-conveyer means distant from said rod-conveyer means for receiving each rod while said toothed-conveyer means continues to operate and after the plate connected to the latter rod has formed part of a stack on said table means.

2. The combination of claim 1 and wherein said toothed conveyer means includes chains which respectively carry said teeth which engage the transport said rods.

3. The combination of claim 1 and wherein said toothed conveyer means includes at said predetermined path of said rod-conveyer means a slide-guide means for directly receiving each rod from said rod-conveyer means and for slidably guiding each rod to teeth of said toothed conveyer means.

4. The combination of claim 3 and wherein an advancing means is situated adjacent said slide-guide means for advancing each rod along said slide-guide means for advancing each rod along said slide-guide means into register with teeth of said toothed conveyer means.

5. The combination of claim 4 and wherein said advancing means includes a pair of rotary wheels each having at least one cam for engaging a rod on said slide-guide means and advancing the latter along said slide-guide means into register with teeth of said toothed conveyer means.

6. The combination of claim 4 and wherein said advancing means advances each rod along said slide-guide means at a speed greater than the speed with which each rod is transported by said rod-conveyer means.

7. The combination of claim 6 and wherein said toothed conveyer means when receiving a rod from said slide-guide means conveys each rod at a speed greater than the speed with which each rod is advanced by said advancing means.

8. The combination of claim 1 and wherein a safety means is situated in the path of falling movement of a plate which falls from a rod during movement of each plate toward and along said plate-turning means, said safety means responding to engagement by a falling plate to terminate the operation of the apparatus and actuate an alarm.

9. The combination of claim 1 and wherein said toothed conveyer means includes in addition to said first-mentioned teeth, counterteeth directed oppositely to said first-mentioned teeth for preventing falling of a rod particularly at the region of the end of the turning movement of each plate into the substantially horizontal attitude over said table means.

10. The combination of claim 1 and wherein each plate has lugs by which it is suspended from a rod, pusher means situated adjacent said rod-receiving means for pushing each rod received therein in a direction disengaging each rod from each plate with the latter forming part of a stack on said table means, and removal means situated in the path of movement of each rod pushed by said pusher means for engaging and removing each rod from said rod-receiving means.

11. The combination of claim 10 and wherein a photocell means is connected with said pusher means and situated adjacent said rod-receiving means for detecting when a rod is received in said rod-receiving means and for actuating said pusher means to push a rod into engagement with said removal means when said photocell means detects arrival of a rod at said rod-receiving means.

12. The combination of claim 1 and wherein an adjusting means is operatively connected to said table means for adjusting the elevation thereof, and photoelectric means operatively connected with said adjusting means for actuating the latter, said photoelectric means being situated adjacent a stack on said table means for detecting when a plate is added to said stack and for responding to arrival of a plate at the top of the forming stack to actuate said adjusting means to lower said table means by an increment corresponding to the thickness of a plate.

13. The combination of claim 1 and wherein a means is operatively connected with said table means for adjusting the inclination thereof.

14. The combination of claim 1 and wherein a counter means is situated adjacent said toothed conveyer means for counting the plates which form a stack on said table means.

15. The combination of claim 14 and wherein an adjusting means is operatively connected with said table means for adjusting the elevation thereof, said adjusting means being operatively connected with said counter means to be actuated thereby when said counter means counts a predetermined number of plates in a stack for lowering said table means to a predetermined lowermost position, and stack-transporting means situated in the path of movement of a stack lowered by said table means while the latter is lowered by said adjusting means to said lowermost position for receiving a stack from said table means and for transporting the stack beyond said table means.

16. The combination of claim 15 and wherein said adjusting means automatically returns said table means back to an uppermost position with said counter means then starting to count the plates of the next stack after the table means has reached said lowermost position thereof and the previously formed stack has been transported by said stack-transporting means beyond the path of movement of said table means.

17. The combination of claim 1 and wherein said plate-turning means includes a stationary cam situated in the path of movement of a plate suspended from a rod while the latter is transported by said toothed conveyer means, said stationary cam having a convex cam surface engaging each plate to provide for rolling and sliding movement of each plate along said cam from the substantially upright hanging attitude of each plate to the substantially horizontal attitude thereof situated over said table means.

* * * * *